United States Patent [19]

Siegel et al.

[11] 4,405,984

[45] Sep. 20, 1983

[54] COIN-OPERATED PHONOGRAPH

[75] Inventors: Lawrence Siegel, Chicago; Edward L. Polanek, Woodstock; Anthony J. Miller, Skokie; Alan L. Woodman, Mount Prospect, all of Ill.

[73] Assignee: Stern Electronics, Inc., Elk Grove Village, Ill.

[21] Appl. No.: 230,398

[22] Filed: Feb. 2, 1981

[51] Int. Cl.³ .................. G05D 29/00; G07F 17/00
[52] U.S. Cl. ............................. 364/410; 194/15; 340/711; 364/479
[58] Field of Search .......... 364/400, 479, 900, 410; 194/1 N, 2, 12, 15; 340/711, 750

[56] References Cited

U.S. PATENT DOCUMENTS

| | | | |
|---|---|---|---|
| 3,456,771 | 7/1969 | Landenberger | 194/12 |
| 3,786,475 | 1/1974 | Staar | 340/711 |
| 3,985,217 | 10/1976 | Kortenhaus et al. | 194/15 |
| 4,040,510 | 8/1977 | Peters et al. | 194/2 |
| 4,087,808 | 5/1978 | Herndon, Jr. | 340/750 |
| 4,197,581 | 4/1980 | Watrous et al. | 364/400 |
| 4,213,524 | 7/1980 | Miyashita et al. | 194/15 X |
| 4,231,105 | 10/1980 | Schuller et al. | 364/479 |
| 4,234,070 | 11/1980 | Heiman | 194/1 N |
| 4,241,400 | 12/1980 | Kiefer | 364/400 |
| 4,245,309 | 1/1981 | Kiefer | 364/400 |
| 4,245,310 | 1/1981 | Kiefer | 364/400 |

Primary Examiner—Felix D. Gruber
Attorney, Agent, or Firm—George H. Gerstman

[57] ABSTRACT

A coin-operated phonograph is provided which includes a cathode ray tube for displaying information, such as title strip data, in alphanumeric form. The phonograph includes means for storing the information to be displayed in digital form. An optical character reader is used for entering the information into storage in the storage means. Means are responsive to the storage means for controlling the presentation of the information on the cathode ray tube.

9 Claims, 4 Drawing Figures

COIN-OPERATED PHONOGRAPH

BACKGROUND OF THE INVENTION

The present invention concerns a novel coin-operated phonograph having an electronic display of information that is useful to the customer and operator.

Coin-operated phonographs typically comprise a cabinet which houses means for playing selected records and a mechanism for detecting the customer's selection, for locating the selected record and for positioning the selected record and playing means relatively for playing of the selected record. It is conventional for title strips to be displayed on the front panel of the cabinet. On older coin-operated phonographs, a selection button is often located immediately adjacent each title strip. In many coin-operated phonographs, particularly the newer types, each of the title strips contains a code number relating to the particular record, and in order to make a selection the customer enters the code number by pressing coded selector buttons that are not positioned adjacent each title strip.

The typical coin-operated phonograph provides a relatively small amount of information to the customer. We have discovered a system by which a relatively large amount of useful information can be presented to a customer and/or operator. For example, by utilizing the present invention the capability may be provided to present to the customer the time of day, the selection being played, the selection being entered by the customer, the amount of credit remaining, the top 10 records, the new records for the week or month, etc. The system may have the capability of being programmed to present a large amount of useful information to the operator. For example, the system may display to the operator the top 20 selections, the bottom 20 selections, the total number of plays, the cash box contents, etc.

In addition to the foregoing, the present invention obviates the need for title strips and may present a display that is attractive to the customer, highly informative to the customer and operator, and thus conducive to greater use of the coin-operated phonograph.

SUMMARY OF THE INVENTION

In accordance with the present invention, a coin-operated phonograph is provided including a cabinet, coin-receiving means, means for playing selected sound recordings, means for customer selection of sound recordings to be played, and a mechanism for detecting the customer's selection, for locating the sound recording and for relatively positioning the selected sound recording and playing means for playing of the selected sound recording.

The improvement comprises means for storing the alphanumeric information to be displayed. The alphanumeric information is stored in digital form. There are also provided means for entering the alphanumeric information into storage in the storage means. Means responsive to the storage means are provided for controlling the presentation of the alphanumeric information on electronic display means. Electronic display means are provided for displaying the information in alphanumeric form.

In the illustrative embodiment, the electronic display means comprises a cathode ray tube. In the illustrative embodiment, a plurality of remote units are provided. The remote units are adapted for positioning at a location separated from the phonograph. Each of the remote units includes electronic display means, coin-receiving means and customer selection means. Means are provided for transmitting data between the remote units and the phonograph.

In the illustrative embodiment, the means for entering the alphanumeric information comprises an optical character reader, a magnetic character reader or a punched card-tape character reader.

A more detailed explanation of the invention is provided in the following description and claims, and is illustrated in the accompanying drawings.

DETAILED DESCRIPTION OF THE ILLUSTRATIVE EMBODIMENT

Figure 1:
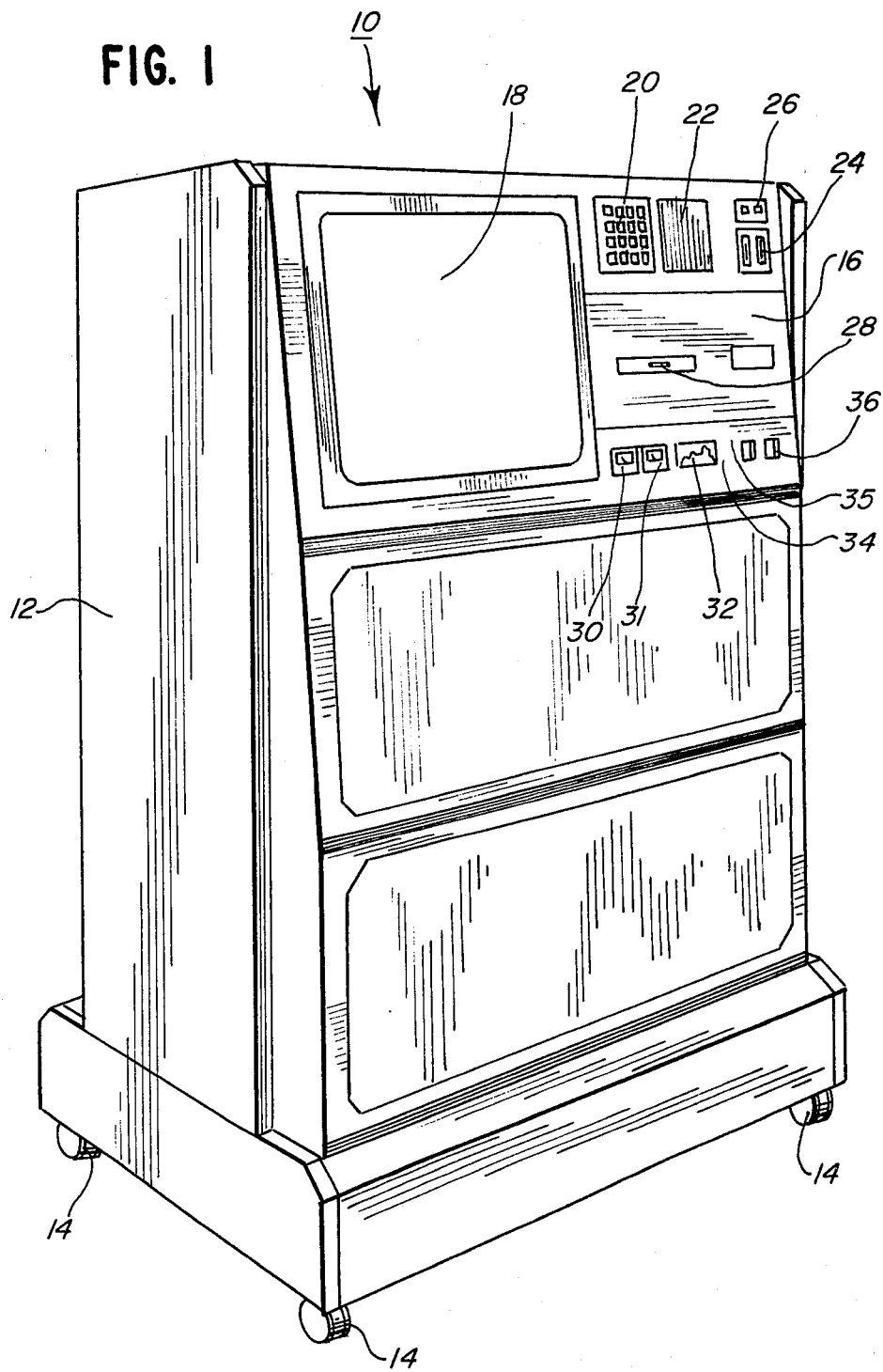
FIG. 1 is a perspective view of a phonograph constructed in accordance with the principles of the present invention.

Referring to the drawings, in FIG. 1 there is shown a coin-operated phonograph 10 constructed in accordance with the principles of the present invention and forming the illustrative embodiment of the present invention. Phonograph 10 comprises a main cabinet 12 movably supported upon four casters 14 and enclosing means for playing selected records, a mechanism for detecting the customer's selection, for locating the record and for positioning the record for playing.

The front panel 16 of housing 12 presents electronic display means 18 in the form of a cathode ray tube video monitor. Adjacent video monitor 18 is a keyboard 20 for enabling customer-selection of the records to be played. A price display 22 is located to the right of keyboard 20 and a pair of coin slots 24 with coin jam release buttons 26 are located to the right of price display 22.

Adjacent video monitor 18 and below keyboard 20 is a dollar bill validator 28. Below validator 28 are a pair of VU meters 30, 31, a plasma display 32 to show audio levels for different frequencies, a pair of tone control buttons 34, 35, and a pair of coin-slug slot returns 36.

Although in the illustrative embodiment it is preferred that phonograph 10 be operative to play two hundred 45 rpm sound records, it is understood that sound recordings that are recorded on other media may be utilized.

Keyboard 20 forms the record selector and is preferably in the form of a 16-button keyboard. It is to be understood, however, that the selector may take many different forms without departing from the scope of the invention.

The video monitor 18 which is enclosed within housing 12 faces front panel 16 and is covered with a sheet of plate glass that is substantially coplanar with the upper portion of front panel 16. It is preferred that video monitor 18 take the form of a 19-inch (diagonal) color video monitor.

Phonograph 10 obviates the need for the type of title strips that are conventionally used on coin-operated phonographs. Instead, alphanumeric data is displayed upon the screen of video monitor 18, with the generated video preferably having a 40 character×24 line resolution. In addition to title strip data being presented on the video monitor 18, there is also presented the time of day, the selection being played, the selection just entered, credit information, an advertisement concerning the services and/or goods available at the phonograph location, a listing of the top 10 records or a listing of the new records of the week or month.

For accounting purposes, video monitor 18 displays the top 10 or 20 selections, the bottom 10 or 20 selections, the total number of plays, the cash box contents, a readout of new selection and location advertisement data as entered, and/or the results of a self-test.

Although the phonograph provides 200 record selections, only a portion of the selections are displayed on the video monitor 18 at one time. A display lasts for 10 seconds and the display of selections is in sequential order. One of the buttons from touch pad 20 is provided to advance to the next screen display when the button is depressed and released, or to hold the current screen display so long as the button is depressed. Once selection commences, the current screen display is held from the time the first digit is selected until either the final digit is selected, or the reset button is pushed, or the advance control button is pushed and released. Alternatively, the information may be "scrolled" on the screen, that is, the information may move upwardly slowly without being held for a time at a fixed position.

Tone control buttons 34 and 35 are operable by the customer to provide bass and treble controls, preferably limited to approximately 10 or 15 percent of full range. The major adjustment of the tone controls is not customer accessible. The tone control buttons 34, 35 are of the push button type wherein the tone varies by specific increment per push.

In accordance with the present invention, the selections may be programmed into the phonograph by the operator in various manners. For example, the program input reader may comprise an optical character reader in which the operator moves a light pen along a bar-coded card. Alternatively, a magnetic card, similar to a credit card, may be utilized for each selection. Alternatively, a punch card or punch tape may be utilized. The phonograph carries a receptacle operable to receive the plug from a reader carried by the operator. For occasional small program changes, keyboard 20 is converted into a programming keyboard. Alternatively, a typewriter-type keyboard is included in the housing and used in lieu of keyboard 20.

A number of remote units are utilized and coupled to the main phonograph console 10. Each of the remote units has a video monitor, coin receiving means and a keyboard. The remote units are operative to transmit credit and selection information to the main console, while the console will transmit title strip, pricing and other data to the remote units.

Figure 2:
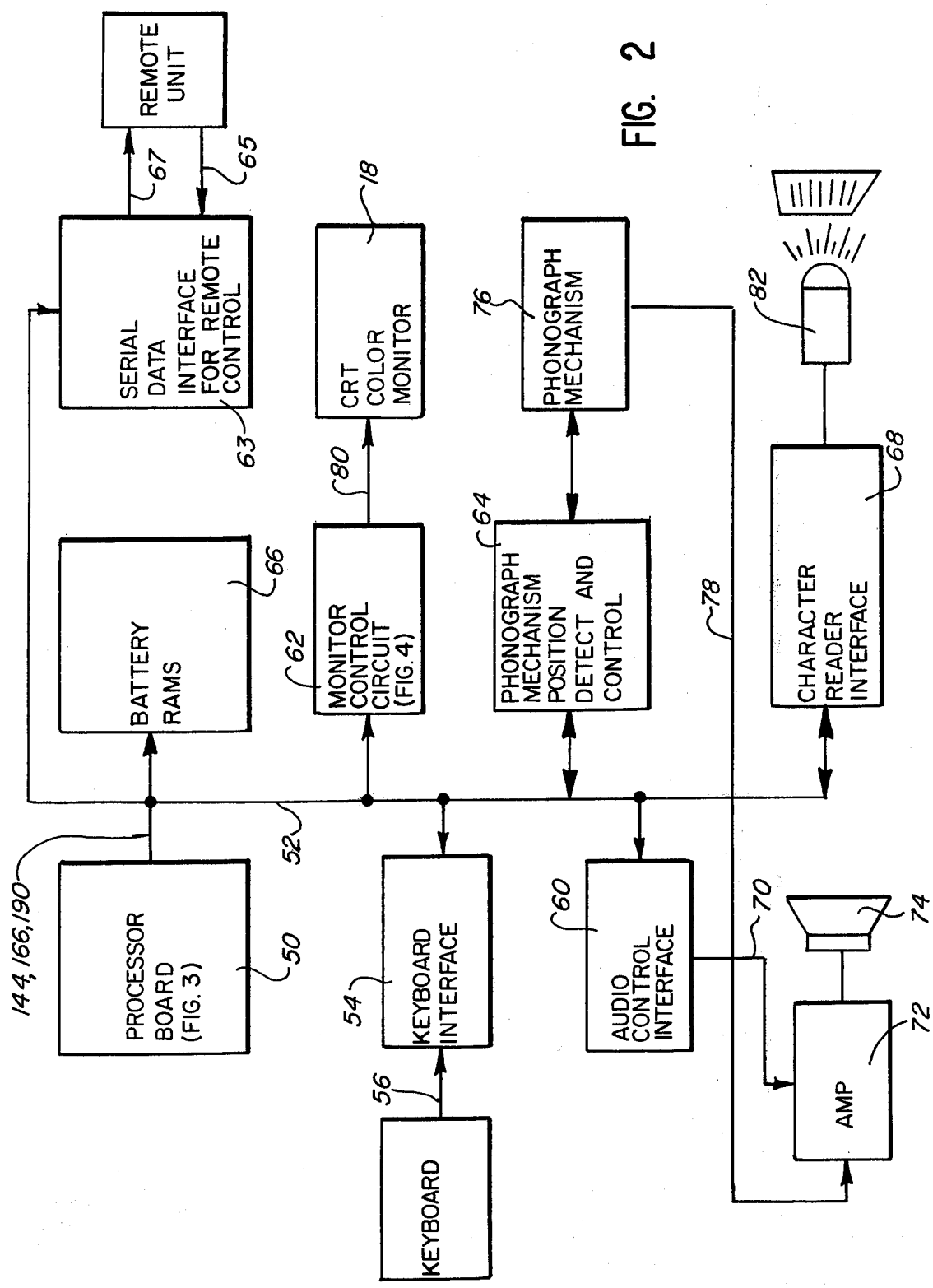
FIG. 2 is a schematic block diagram of an electronic control and display system for the phonograph of FIG. 1.

The basic operation of the system is illustrated in the block diagram of FIG. 2. Referring to FIG. 2, a microprocessor board 50 (shown in more detail in FIG. 3) is coupled to a main bus 52. Also coupled to main bus 52 is a keyboard interface 54 which is coupled via line 56 to keyboard 20, audio control interface 60 which is controlled by microprocessor 50, monitor control circuit 62 (shown in more detail in FIG. 4) which is also controlled by microprocessor 50, serial data interface 63 which is controlled by microprocessor 50, mechanism position, detect and control circuitry 64 which is also controlled by microprocessor 50, battery-supported RAMs 66 which are also controlled by microprocessor 50, and character reader interface 68 which is also controlled by microprocessor 50. Audio control interface 60 is coupled via line 70 to amplifier 72 which is connected to loudspeakers 74. Mechanism position, detector and control circuit 64 operates a record changing mechanism 76 which includes the tone arm and is coupled to amplifier 72 via line 78.

The monitor control circuitry 62 is coupled to color video monitor 18 via line 80. Character reader interface 68 may be in the form of an optical character reader which is coupled to a reading mechanism 82, such as a light pen. As stated previously, the character reader can be other than optical, if desired.

Serial data interface 63 includes an input line 65 and an output line 67 which are coupled to the remote units discussed above. Serial data interface 63 receives credit and selection data from the remote units and also receives serial command information from a unit which is under the control of the location owner, such as a remote volume control or tone control. The serial data interface 63 transmits data via line 67 to the remote units, giving them information such as the acknowledgement of a selection, amount of credit, etc. In addition, the complete program is also transmitted on line 67, which program could be the same as is displayed on the color monitor 18.

Battery-supported RAMs 66 contain the total entered title strip data and other data, such as most popular records, least popular records, credit information, etc. The characters presently being displayed on the screen are stored in a screen character RAM, which is discussed below in connection with the monitor circuitry.

Figure 3:
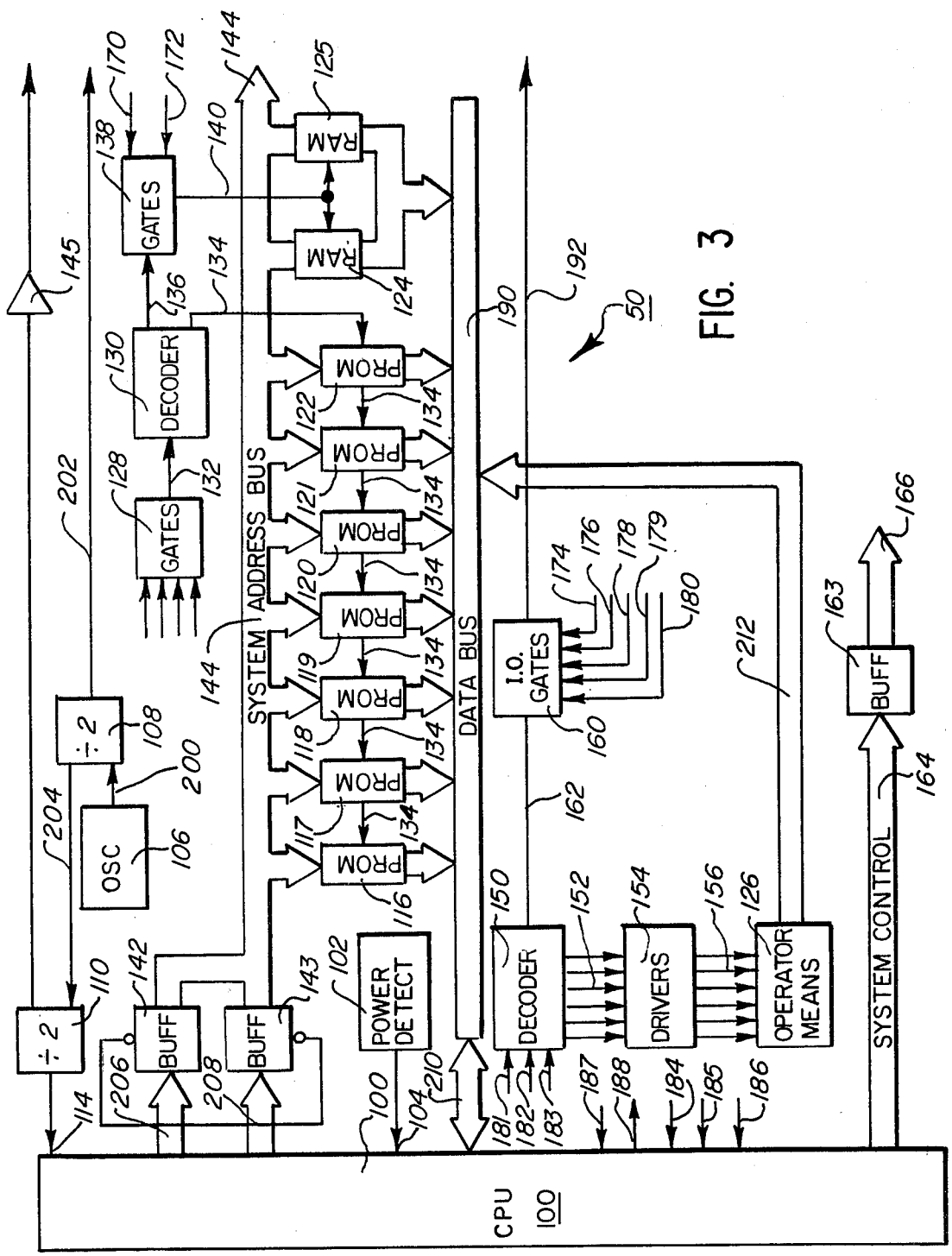
FIG. 3 is a schematic block diagram of the processor control circuit of FIG. 2.

The microprocessor board 50 is illustrated in FIG. 3. The microprocessor board 50 contains a microprocessor 100 which is responsible for receiving inputs from various portions of the system and providing the outputs in order to control the system. Microprocessor 100 has a power detector circuit 102 connected to reset input 104. A clock generator circuit comprising a crystal oscillator 106, a divide by-two-circuit 108 and a divide-by-two circuit 110, are coupled to the clock input 114 of microprocessor 100. Although no limitation is intended, crystal oscillator 106 may be a 10 megahertz crystal oscillator to provide a 2.5 megahertz clock signal at input 114.

The program memory comprises seven PROMs 116, 117, 118, 119, 120, 121 and 122, a scratch pad memory comprising RAMs 124 and 125, and operator means 126. Operator means 126 includes a group of setting switches used by the operator (not accessible to the customer) for adjusting the number of plays per coin, etc. Gates 128 coupled to decoder 130 via line 132 are used to ensure that PROMs 116–122 are read out at the proper time. While one output of decoder 130 is coupled via line 134 to PROMs 112–116, another output of the decoder 130 is coupled via line 136 to gates 138. Gates 138 are coupled via line 140 to RAMs 124, 125 and provide the proper timing for the RAMs and operate to ensure that the RAMs 124, 125 are accessed at the proper time.

A pair of parallel buffers 142, 143 are connected to microprocessor 100 and provide the proper drive signals for the devices coupled to the system address bus 144. A buffer amplifier 145 is utilized to provide the buffer signal from the clock to the rest of the system.

A three-to-eight decoder 150 is coupled via lines 152 to driver transistors 154 which are coupled via lines 156 to operator means 126 in the form of setting switches as discussed above. Decoder 150 and drivers 154 are used as permit the microprocessor 100 to read the operator controls from operator means 126 at the proper time. Input/output gates 160, coupled to decoder 150 via line 162, operates for address decoding to signal other peripherals, such as the keyboard interface port, the mechanism selector control input, etc. Buffer 163 is coupled to microprocessor 100 and provides the drive required on the system control signals, such as read, write, memory request, etc. The signals on line 164 and 166 effectively tell the rest of the system what the microprocessor 100 is doing at any given time.

A "read" signal on line 170 to gates 138 and a "write" signal on line 172 to gates 138 emanate from line 166. The input/output request on line 174 to gates 160 and the machine cycle input on line 176 to gates 160 also are derived from line 166. The address signals on lines 178, 179 and 180 to gates 160, and the address signals on lines 181, 182 and 183 to decoder 150 are derived from the system address bus 144. Control signals are fed to microprocessor 100 via lines 184, 185 and 186 to alert microprocessor 100 of important conditions occurring within the system, such as the fact that there is data coming in from a remote unit that has to be dealt with, that an error condition exists, etc. "Wait" signals are provided via line 187 and "halt" signals exit from microprocessor 100 via line 188.

The PROMs 116–122 and RAMs 124, 125 couple system address bus 144 to data bus 190. An input/output address signal outputting from gates 160 is fed via line 192 to other boards.

Still referring to FIG. 3, it can be seen that crystal oscillator 106 is coupled to divide-by-two circuit 108 via line 200, and the output line 202 from divide-by-two circuit 108 provides a clock signal to other boards. Output line 204 from divide-by-two circuit 108 is coupled to an input of divide-by-two circuit 110 to provide a clock signal at input 114 that is one-fourth the crystal oscillator frequency.

Buffer amplifiers 142 and 143 are coupled to microprocessor 100 by lines 206 and 208, and the output of buffer amplifiers 142 and 143 form system address bus 144 which is fed to other boards. Data bus 190 is coupled to microprocessor 100 via line 210 and operator switches 126 are coupled to data bus 10 via line 212.

Figure 4:
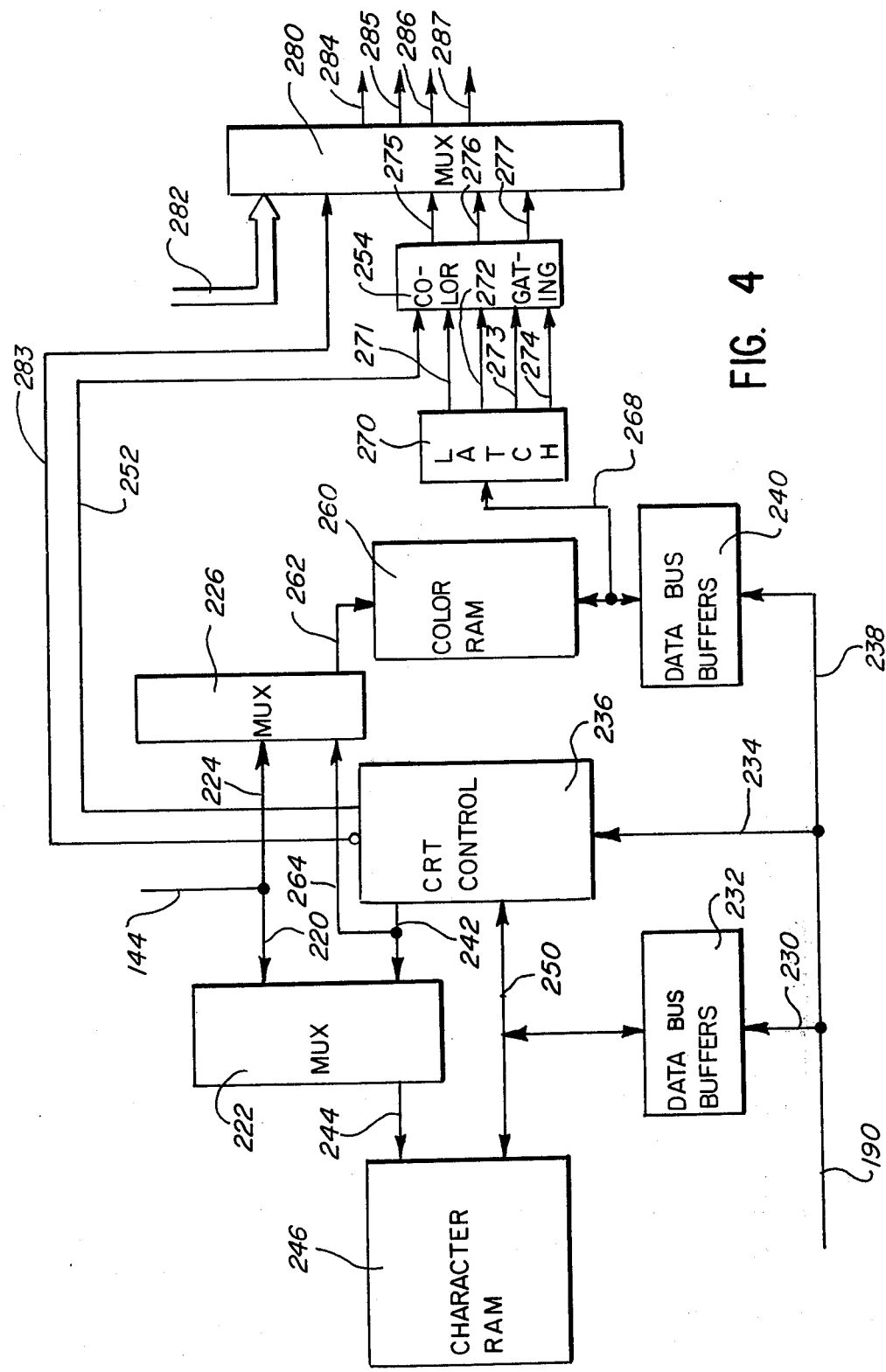
FIG. 4 is a schematic block diagram of the cathode ray tube control circuit of FIG. 2.

The monitor control circuitry is illustrated in FIG. 4. Referring to FIG. 4, it is seen that system address bus 144 (also shown in FIG. 3), which is the address bus from the microprocessor board, is coupled via line 220 to two-to-one multiplexer 222 and by line 224 to a two-to-one multiplexer 226. The data bus line 190 (also shown in FIG. 3) is coupled via line 230 to data bus buffers 232, via line 234 to CRT controller 236, and via line 238 to data bus buffers 240. CRT control 236 is in the form of an integrated circuit chip, such as a Motorola 6845 integrated circuit, to provide timing signals to place the alphanumeric character data on the video monitor 18 at the proper place. CRT control 236 generates addresses via line 242 to multiplexer 222 which outputs via line 244 to a screen character RAM 246. The screen character RAM 246 contains ASCII encoded data which relates to alphanumeric characters. In the illustrative embodiment, character RAM 246 comprises two 1K×4 static RAMs, connected in parallel to form a 1K×8 RAM. The data from RAMs 246 is coupled to CRT control 236 via line 250 and is thus read by CRT control 236, is converted into a dot pattern and is transmitted via line 252 to color gating circuitry 254. The video signal on line 252 comprises a dot pattern which correlates to the alphanumeric characters which will be presented on the screen.

A character color RAM 260 is coupled to the output of multiplexer 226 via line 262, and multiplexer 226 is coupled to an output of CRT controller 236 via line 264. Color RAM 260 preferably comprises one 1K×4 RAM, which is used to designate the color of each character on the screen. It can be seen that color RAM 260 is addressed by CRT controller 236 through multiplexer 226. The character color RAM 260 provides a signal on line 268 which is fed through latch 270 to provide red, green, blue and intensity signals on lines 271, 272, 273 and 274, respectively, to color gating circuit 254. Color gating circuit 254 combines the video red, green, blue and intensity signals to provide red, green and blue color character signals on lines 275, 276, 277, respectively, which are fed to multiplexer 280. Multiplexer 280 provides sync signals to the video monitor 18.

The output signals from a video cassette player may be provided on line 282 to an input of multiplexer 280. Microprocessor 100 controls what is on the screen at a particular time, either the analog signals from the video cassette player or the sync signals resulting from the alphanumeric character generation described above.

Multiplexers 222 and 226 couple the character RAM 246 and color RAM 260, respectively, to the microprocessor address bus 144 to permit the microprocessor access to the RAMs 246 and 260. Data bus buffers 232 and 240 permit data to be fed from or to the RAMs 246 and 260 with respect to microprocessor 100.

The cathode ray tube controller chip 236 provides a sync signal via line 283, which is multiplexed by multiplexer 280 and fed via line 284 to the video monitor 18, to instruct the video monitor where to position the electron beam. The multiplexed red, green and blue signals are provided on lines 285, 286 and 287, respectively.

It can be seen that a novel phonograph has been provided which can present a relatively large amount of useful information to a customer and/or operator on a video monitor. Although an illustrative embodiment of the invention has been shown and described, it is to be understood that various modifications and substitutions may be made by those skilled in the art without departing from the novel spirit and scope of the present invention.

That which is claimed is:

1. A coin-operated phonograph including a cabinet, coin-receiving means, means for playing selected sound recordings, means for customer selection of sound recordings to be played, a mechanism for detecting the customer's selection, for locating the sound recording and for relatively positioning the selected sound recording and playing means for playing of the selected sound recording, the improvement comprising, in combination:
   (a) means for storing alphanumeric information to be displayed; said alphanumeric information being stored in digital form;
   (b) means for entering the alphanumeric information into storage in said storage means;

(c) means responsive to said storage means for controlling the presentation of the alphanumeric information on electronic display means; and
(d) electronic display means for displaying the information in alphanumeric form.

2. A coin-operated phonograph as described in claim 1, in which said electronic display means comprises a cathode ray tube.

3. A coin-operated phonograph as described in claim 1, in which said electronic display means comprises a video monitor.

4. A coin-operated phonograph as described in claim 1, including a plurality of remote units, adapted for positioning at a location separated from said cabinet, each of said remote units including electronic display means, coin-receiving means and customer selection means; and means for transmitting data between said remote units and said cabinet.

5. A coin-operated phonograph as described in claim 1, in which said entering means comprises an optical character reader.

6. A coin-operated phonograph as described in claim 1, in which said entering means comprises a magnetic character reader.

7. A coin-operated phonograph as described in claim 1, in which said entering means comprises a punched card reader.

8. A coin-operated phonograph as described in claim 1, in which said entering means comprises a punched tape character reader.

9. A coin-operated phonograph including a cabinet, coin-receiving means, means for playing selected sound recordings, means for customer selection of sound recordings to be played, a mechanism for detecting the customer's selection, for locating the sound recording and for relatively positioning the selected sound recording and playing means for playing of the selected sound recording, the improvement comprising, in combination:

(a) means for storing alphanumeric information to be displayed, said alphanumeric information being stored in digital form;
(b) an optical character reader for entering the alphanumeric information into storage in said storage means;
(c) means responsive to said storage means for controlling the presentation of the alphanumeric information on a cathode ray tube;
(d) a cathode ray tube for displaying the information in alphanumeric form; and
(e) a plurality of remote units, adapted for positioning at a location separated from said housing, each of said remote units including electronic display means, coin-receiving means and customer selection means; and means for transmitting data between said remote units and said console.

* * * * *